United States Patent
Atwood et al.

(10) Patent No.: US 11,508,058 B2
(45) Date of Patent: Nov. 22, 2022

(54) SYSTEM AND METHOD FOR EVALUATING IMPACTS OF DEFECTS IN PRINTED IMAGES

(71) Applicant: Xerox Corporation, Norwalk, CT (US)

(72) Inventors: Christopher Douglas Atwood, Rochester, NY (US); Joseph Fredrick Casey, Webster, NY (US); Frank Tamarez Gomez, Webster, NY (US); Joseph M. Ferrara, Jr., Webster, NY (US); Jacob R. McCarthy, Williamson, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/209,520

(22) Filed: Mar. 23, 2021

(65) Prior Publication Data

US 2022/0309634 A1    Sep. 29, 2022

(51) Int. Cl.
*G06T 7/00* (2017.01)
*G06K 15/00* (2006.01)
*G06K 9/62* (2022.01)

(52) U.S. Cl.
CPC .............. *G06T 7/001* (2013.01); *G06K 9/628* (2013.01); *G06K 15/408* (2013.01);
(Continued)

(58) Field of Classification Search
CPC ........... G06T 7/001; G06T 2207/10024; G06T 2207/30144; G06T 2207/20072; G06T 7/194; G06T 7/33; G06T 2207/20081; G06T 2207/20084; G06T 7/00; G06T 7/60; G06T 7/70; G06T 7/90; G06T 2207/20016; G06T 2207/20076; G06T 2207/20224; G06T 5/002; G06T 2207/10004; G06T 2207/10056; G06T 2207/10152; G06T 2207/30024; G06T 2207/30244;
(Continued)

(56) References Cited

U.S. PATENT DOCUMENTS 6,545,743 B1 * 4/2003 Luo ......................... G06T 7/143
355/56
7,034,848 B2 4/2006 Sobol
(Continued)

OTHER PUBLICATIONS

U.S. Appl. No. 16/988,183, filed Aug. 7, 2020, Taylor.
(Continued)

*Primary Examiner* — Negussie Worku
(74) *Attorney, Agent, or Firm* — Fay Sharpe LLP (57) ABSTRACT

A system and method evaluate defects in printed images. A target image, which has been captured of a printed image, is processed to identify defects, where present, which do not occur in a source image from which the printed image was generated. A trained classification model predicts a defect class for respective regions of the target image, each of the defect classes being drawn from a predefined set of defect classes. For at least one of the identified defects, a measure of severity of the defect is determined, such as a size of the defect. A decision on the acceptability of the printed image is made, based on the measure of severity of the at least one defect and the predicted defect class of a respective one of the regions in which the defect occurs.

20 Claims, 5 Drawing Sheets

(52) U.S. Cl.
CPC ............... *G06T 2207/10008* (2013.01); *G06T 2207/20081* (2013.01); *G06T 2207/20084* (2013.01); *G06T 2207/30144* (2013.01)

(58) Field of Classification Search
CPC ......... G06T 3/0068; G06T 5/006; G06T 5/50; G06T 7/0016; G06T 7/11; G06T 7/13; G06T 7/30; G06T 7/337; G06T 7/62; G06T 7/73; G06T 7/74; G06V 10/993; G06V 10/454; G06K 15/1878; G06K 9/6232; G06K 9/627; H04N 1/00005; H04N 1/00015; H04N 1/00039; H04N 1/00047; H04N 1/0005; H04N 1/00063; H04N 1/00082; H04N 1/2307; H04N 1/54; H04N 1/00034; H04N 1/00042; H04N 1/00092; H04N 1/40068; H04N 1/6002; H04N 1/60; H04N 1/6075; H04N 1/62; H04N 1/6005; H04N 9/87; H04N 1/6036; B33Y 50/02; G03G 15/5016; G05B 13/027; G06F 3/011; G06F 3/016; G06F 3/017; G06F 3/04883; G06F 3/122; G06F 3/1224; G06F 3/1244; G06F 3/1284
USPC ......................................................... 358/1.15
See application file for complete search history.

(56) References Cited

U.S. PATENT DOCUMENTS

| | | | |
|---|---|---|---|
| 7,519,222 B2 | 4/2009 | Kisilev | |
| 7,773,774 B2* | 8/2010 | Rasmussen | H04N 1/00068 358/3.23 |
| 10,657,635 B2* | 5/2020 | Kaneko | G06T 7/13 |
| 10,878,300 B2* | 12/2020 | Chen | G06T 7/194 |
| 11,250,558 B2* | 2/2022 | Oki | G06T 7/001 |
| 2006/0072847 A1 | 4/2006 | Chor | |
| 2011/0069894 A1* | 3/2011 | Vans | G06V 10/993 382/218 |
| 2012/0045134 A1 | 2/2012 | Perronnin | |
| 2012/0076401 A1 | 3/2012 | Sanchez | |
| 2015/0332451 A1* | 11/2015 | Amzaleg | G06T 7/0002 382/149 |
| 2017/0169315 A1 | 6/2017 | Vaca Castano | |
| 2017/0308770 A1* | 10/2017 | Jetley | G06V 10/82 |
| 2019/0220702 A1 | 7/2019 | Wshah | |
| 2020/0133182 A1* | 4/2020 | Haik | H04N 1/40068 |
| 2020/0210792 A1* | 7/2020 | Chen | G06K 15/1878 |
| 2022/0069894 A1* | 3/2022 | Lehnich | H04B 7/15507 |

OTHER PUBLICATIONS

A. Krizhevsky, et al., "ImageNet Classification with Deep Convolutional Neural Networks," NIPS, 2012.
Perronnin, et al., "Fisher kernels on visual vocabularies for image categorization" in CVPR (2007).
Sánchez, et al., "Improving the fisher kernel for large-scale image classification," Proc. 11th European Conference on Computer Vision (ECCV): Part IV, pp. 143-156 (2010).
Sánchez, et al., "High-dimensional signature compression for large-scale image classification," in CVPR 2011.

* cited by examiner

SYSTEM AND METHOD FOR EVALUATING IMPACTS OF DEFECTS IN PRINTED IMAGES

BACKGROUND

The exemplary embodiment relates to evaluation of the impacts of defects in printed images on image quality and finds particular application in a system and method in which detected defects may be ignored or addressed differently when they are located in regions where they are expected to be less noticeable.

Printers are now often provided with automatic defect detection components. For example, the defect detection may be set to recognize defects which meet or exceed a threshold area of a printed image, allowing some action to be taken, such as automatically discarding printed pages containing such defects, or alerting a user of the occurrence. This can result in significant costs, both in terms of wasted materials, but also in the time taken to reprint the discarded pages. One problem with this approach is that customers may be willing to accept defects that meet the threshold if they are located in less important areas of the printed image. Thus, pages are reprinted which would be considered acceptable. For example, on a portrait, a small defect may appear in the image behind the person, which may still be an acceptable quality print.

There remains a need for a system and method which are able to categorize detected defects, based on whether the region in which they are located is more or less significant within an image. This may reduce the reject rate and reduce the cost per print.

INCORPORATION BY REFERENCE

The following references, the disclosures of which are incorporated herein in their entireties by reference, are mentioned.

U.S. Pat. No. 7,519,222, issued Apr. 14, 2009, entitled PRINT DEFECT DETECTION, by Kisilev, et al., describes automatic detection of print defects in printed matter. Detail maps of a reference image and a corresponding scanned image are generated by identifying differences between pixels in each of one or more directions. Blocks of the reference image detail map and the respective blocks of the scanned image detail maps are compared.

U.S. Pat. No. 7,773,774, issued Aug. 10, 2010, entitled DYNAMIC TEST PATTERN COMPOSITION FOR IMAGE-ANALYSIS BASED AUTOMATIC MACHINE DIAGNOSTICS, by Rasmussen, et al., describes a system and method for test target selection in conjunction with dynamic test pattern generation. A test pattern page is composed using an optimal set of test targets, which can be accommodated or adjusted to fit within size constraints of the test pattern, based on layout optimization to ensure that related and optimized test targets are accommodated on a single test pattern.

U.S. application Ser. No. 16/988,183, filed Aug. 7, 2020, entitled SYSTEM AND METHOD FOR MEASURING IMAGE ON PAPER REGISTRATION USING CUSTOMER SOURCE IMAGES, by Douglas R. Taylor, et al., describes a method for performing registration between a source image and a printed image.

BRIEF DESCRIPTION

In accordance with one aspect of the exemplary embodiment, a method for evaluating defects in printed images includes receiving a target image, which has been captured of a printed image. One or more defects in the target image, where present, which do not occur in a source image from which the printed image was generated, are identified. With a trained classification model, a defect class is predicted for respective regions of the target image, each of the defect classes being drawn from a predefined set of defect classes. For at least one of the identified defects, a measure of severity of the defect is determined. A decision on the acceptability of the printed image is made, based on the measure of severity of the at least one defect and the predicted defect class of a respective one of the regions in which the defect occurs.

One or more steps of the method may be performed with a processor.

In accordance with another aspect of the exemplary embodiment, a system for evaluating defects in printed images includes memory which stores instructions for performing the method described above and a processor in communication with the memory which executes the instructions.

In accordance with another aspect of the exemplary embodiment, a system for evaluating defects in printed images includes a printer which renders a source image on print media to generate a printed image. An image capture device captures a target image of the printed image. The system further includes classification model, which has been trained to predict defect classes for regions of an image drawn from a set of predefined defect classes, each of the defect classes being associated with a threshold defect size. A defect evaluation component is configured for identifying any defects in regions of the target image which each exceed a threshold size for a predicted class output by the model for a respective one of the regions in which the defect is located and for making a determination on an acceptability of the printed image based, on at least one of the identified defects.

In accordance with another aspect of the exemplary embodiment, a method for evaluating defects in printed images includes printing a digital source image on a sheet of print media using marking materials to generate a printed image, capturing a digital target image of the printed image, with a trained classification model, predicting a respective class for each of at least one region of the source image, each of the classes being drawn from a set of classes, each of the classes in the set being associated with a respective threshold measure of severity, identifying at least one defect in the target image, where present, which does not occur in the source image and which meets the threshold measure of severity for a respective region in which the defect is located, and determining an acceptability of the printed image based on the identified at least one defect, where present.

One or more steps of the method may be performed with a processor.

DETAILED DESCRIPTION

Aspects of the exemplary embodiment relate to a system and method for addressing printing defects in printed images, such as photographs, which take into consideration a measure of significance of image regions, in addition to a measure of severity of the print defects within the image regions. For example, the system may allow no defects in regions of high significance, small defects in regions of medium significance, or large defects in regions of low significance.

In the exemplary embodiment, machine learning is used to learn to identify the significance of regions of an image. The machine learning may also be used to identify the severity of the print defect(s) within those regions of the image, when printed. In this way, printed images with severe (e.g., meeting a threshold of the measure of severity) defects in regions identified as being of high significance can be addressed differently than printed images with severe defects only in regions of low significance, e.g., by rejecting printed images with severe defects in regions of high significance.

Examples of significant regions of an image may include people, people's faces, and/or other subjects, such as animals, buildings, vehicles, and the like. Significant regions may be different for different applications. For example, in the case of a publication related to cars, regions of images including cars may be more likely to be identified as being of higher significance than those containing buildings, and vice versa. In some cases, the system may identify that the entire image is of equal significance. Examples of such images include images with no particular subject, such as a photo of a sunset over a beach; images in which a subject occupies most or the entirety of the image, such as a close-up of a face; and images including a plurality of subjects, such that the total area occupied by the subjects is substantially the entire image, such as a group photo of a sports team or a photo of a city skyline.

Figure 1:
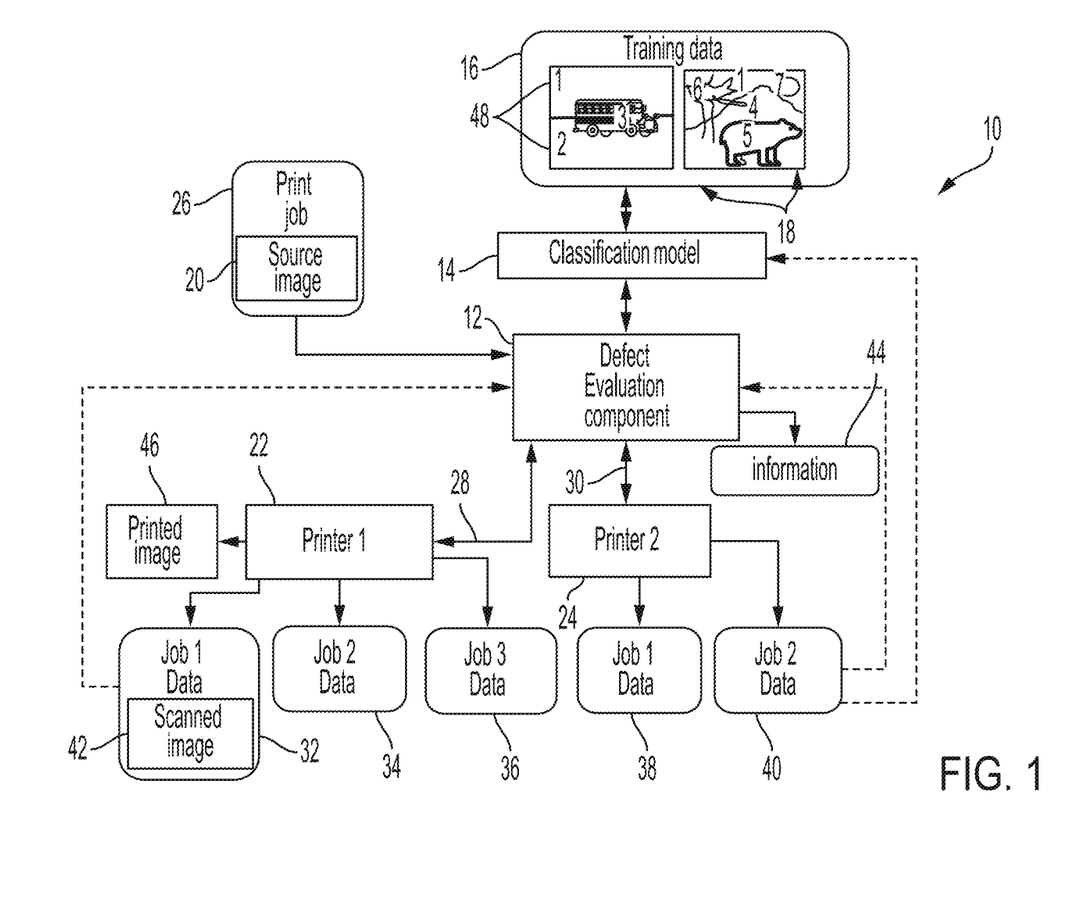
FIG. 1 is an overview of a system for evaluating impacts of printed image defects.

With reference to FIG. 1, a system 10 for evaluating and addressing printed image defects is shown. The system 10 includes a defect evaluation component 12, which incorporates, or has access to, a region classification model 14. The model 14 may have been trained on a collection of training data 16 including annotated training images 18, to be able to assign a class and/or measure of significance, with respect to defects, to regions of an input source image 20, or to output a decision based thereon. The system 10 may further include one or more printers 22, 24, etc., for printing print jobs 26. The printers may be in communication with the evaluation component 12, or with respective evaluation components, by wired or wireless links 28, 30, etc. Alternatively, one or more of the printers may each incorporate a respective evaluation component 12.

Print job data 32, 34, 36, 38, 40, etc., is acquired for print jobs 26 printed by the printers. The print job data may include captured digital images (e.g., scanned images) 42 of printed images 46 that that have been printed by respective printers. The print job data 32, 34, 36, 38, 40 is evaluated by the evaluation component 12, using the region classification model 14 to guide the decision on whether a detected printed image defect is acceptable, or not. Some or all of the scanned images 42 in the print job data 32, 34, 36, 38, 40 may also be used as training data 16 to update the model 14. The evaluation component 12 outputs information 44, e.g., decisions on acceptability of the printed image and/or printing modifications, for addressing defects identified in the scanned images 42.

Each print job 26 may include one or more "source image(s)" 20 to be printed. Each source image may generally include information in electronic form which is to be rendered on print media by one or more of the printers 22, 24, etc. and may include text, graphics, photographic images, and the like. The content of the source image may be defined by an array of pixels of different colors (or monochrome shades of grey). Images 20 may be received by the system 10 in any convenient file format, such as JPEG, GIF, JBIG, BMP, TIFF, or the like or other common file format used for images and which may optionally be converted to another suitable format prior to printing. For convenience, such converted images are also referred to as source images. The exemplary source images 20 used herein are generally customer source images, i.e., they are not calibration images. Calibration images are specifically pre-designed with fiducial marks for conventional image on paper registration. The locations of the fiducial marks, e.g., crosses, bullseyes, or the like, relative to the corners of the page, are known, prior to printing. In contrast, a source image lacks such fiducial marks. The print job 26 may be received from a customer device (not shown), such as a computer, memory storage device, or the like.

A "printed image" 46 is an image printed on print media, such as paper, by a printer 22, 24, using a marking material, such as colored ink(s) or toners.

A "scanned image" 42 is a captured digital image of a printed image 46. One or more scanned images may be incorporated in the job data 32 for a given print job.

A "training image" 18 may be a source image 20, scanned image 42, or other digital image in which regions of the image are identified (e.g., by a bounding box or irregular perimeter) and manually annotated with a respective class 48, selected from a plurality of predefined classes.

A "printer" 20, 22 can be any device for forming printed images 46 on print media using one or more marking materials. A printer can be a copier, laser printer, bookmaking machine, facsimile machine, or a multifunction machine (which includes one or more functions such as scanning, printing, archiving, emailing, and faxing).

"Print media" can be a flexible physical sheet of paper, plastic, or other suitable physical print media substrate for images. The operation of applying images to print media, for example, graphics, text, photographs, etc., is generally referred to herein as printing or rendering.

"Printed image defects," as used herein, can be any detectable differences between a source image 18 and a printed image 46 that can be captured in a corresponding scanned image 42. Examples of such defects include streaks, mottle, moiré, and overcompensation effects. Streaks may occur in inkjet printing when one of the inkjets becomes clogged and does not emit droplets, or in a xerographic (laser) printer when the photoreceptor retains some toner after cleaning. These bands of different color (or no color) in the printed image tend to run either vertically or horizontally. Mottle may occur in inkjet printers when an inkjet drop produces satellite drops, for example, when it is not immediately absorbed by the print media. Overcompensation effects can occur when the printer is attempting to compensate for known printed image defects. For example, if one of the inkjets is not firing, adjacent inkjets may be called on to generate larger drops to fill in the corresponding regions of the sheet, which may result in a noticeable darker streak.

Other defects may occur through uneven drying of sheets, poor registration of different color separations, and the like.

The present system and method assume that some printed image defects are acceptable to customers for at least some types of print jobs and that these defects may be acceptable in some regions of an image but not in others. In particular, printed image may be unacceptable (or less acceptable) if they occur in people's faces, while the same sort of defects may be acceptable (or more acceptable) in background regions, such as trees and roads, particularly if the defect is consistent with normal color variations in those regions. Thus, for example, rather than flagging all defects which meet or exceed a threshold size (and/or other measure of severity of a defect), the same size of defect may be accepted by the system if it occurs in one region, but not in another. As a result, fewer print jobs/pages may need to be reprinted. In some embodiments, other features of defects may be considered, such as the type of defect. For example, mottle may be considered a significant defect if it occurs on a face but less significant if it occurs in a region of trees.

The exemplary region classification model 14 may include a neural network, or other machine learning model, which is trained, using training data 16, to segment and classify regions in an image, based on visual content or, more generally, identify regions where any defects can be expected to be more significant (objectionable to a customer). In one embodiment, data from all customer jobs is fed back to an image database to update the classification model 14.

Figure 2:
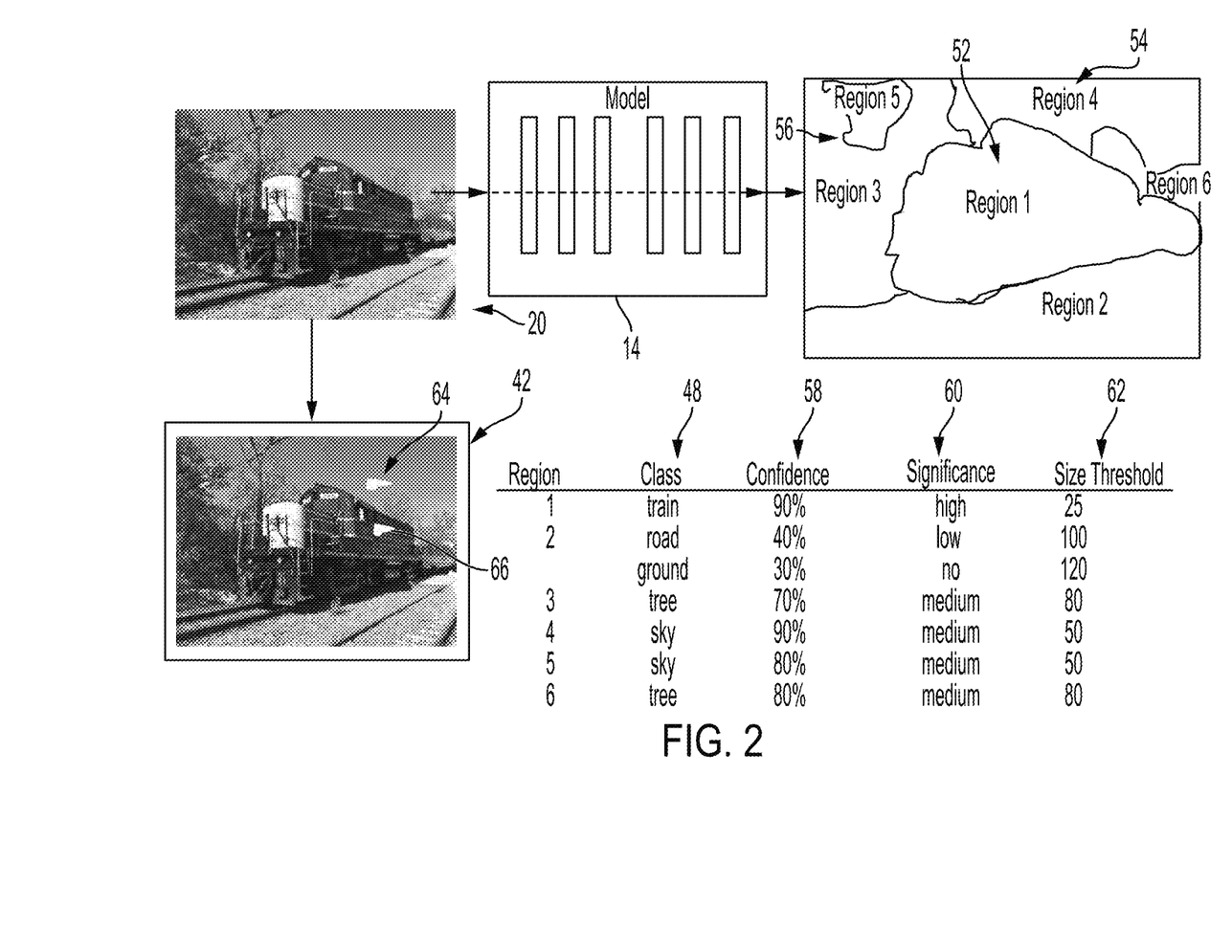
FIG. 2 illustrates the identification of regions of an image and associated thresholds for a measure of severity of defects in different regions.

In one embodiment, illustrated in FIG. 2, the model 14 may receive as input a source image 20 to be printed (or a corresponding scanned image 42) and segment the input image into one or more regions, such as regions 52, 54, 56, etc., which are each associated with a respective class (or classes) 48, drawn from a set of predefined classes. There may be any number of predefined classes, such as two, three, at least five, at least ten, at least twenty, at least fifty, or up to 5000, or more, such as up to 500. In one embodiment, the classes include visual object classes, such as tree, person, face, building, road, sky, train, car, dog, text, etc.

In some embodiments, a confidence 58 may be assigned to the predicted class(es), which indicates a likelihood that the class predicted for the region 52, 54, 56 is correct. Only the class(es) with the highest confidence may be identified.

In some embodiments, the regions or visual object classes are assigned to a significance group 60, for example, "person" and "face" may be grouped in a high significance group, "car" and "dog" may be grouped in a medium significance group, while "road" and "sky" may be grouped in a low significance group, indicating that a defect of a given size in the "high" significance group is more likely to be significant than a defect of the same size in the "medium" or "low" significance groups. The number of significance groups is not limited and may be for example, at least two, such as at least three, or at least four, and may be up to ten, for example. In another embodiment, the model 14 may segment the source image 18 into a maximum of two regions, e.g., foreground and background regions (i.e., two classes of region), corresponding to significant and not significant (or less significant).

In one embodiment, the system may identify the type of defect in a region such as random specks or mottle, and determine that the existing image data in that region already has a high degree of random specks and/or mottle, so those defects may be considered of lower significance, whereas a streak has a low degree of similarity to that region of the image, so that type of defect may be considered significant.

There may be at least two or at least three or up to ten predefined defect type classes 48, each class corresponding to a respective type of defect.

In one embodiment, classes 48 and/or significance groups 60 may each be associated, in memory, with a respective threshold on a degree of the severity of a defect. In one embodiment, severity is measured in terms of defect size. A defect size threshold 62 can be a minimum number of pixels or other measure of the size of a defect (e.g., as a proportion of the image) at which a defect in the respective region is considered significant. For example, the area threshold could be 25 pixels for a defect 66 in a high significance region 52, and may be larger, e.g., 50 pixels, for a defect 64 in a lower significance region 54. In this embodiment, if the area threshold 62 is not met, the defect may be ignored. Where a region cannot be assigned to one object class with a high level of confidence, an average threshold of two (or more) classes may be used, as in the case of region 2 in FIG. 2.

In another embodiment, defect severity is alternatively or additionally measured in terms of a degree of similarity of the defect to the original image data to determine if the defect would blend in with that region of the image. If a defect is similar in color and/or texture to the original image data it may be considered of low significance, while if the defect is dissimilar in color and/or texture to the original image data it may be of higher significance.

In another embodiment, defect severity additionally or alternatively is determined in terms of the type of defect. For example, a customer may consider streaks more significant than mottle.

As will be appreciated, the decision on whether a defect is considered significant for a given class of region may include a combination of these severity factors.

As shown in the illustrative scanned image 42, when the source image 20 is printed and scanned, printed image defects 64, 66 (enlarged for clarity) can be associated with respective class(es) 48 (e.g., "train," "sky,") or significance groups (e.g., "high significance," "low significance") of the regions 54, 52, in which they are located. The threshold 62 for the class/group determines whether or not each defect 64, 66 is considered significant. For example, if the defect 64 is 48 pixels in size, i.e., below the threshold of 50 pixels for "sky" in the exemplary embodiment, it may be considered insignificant or of low significance. In contrast, if the defect 66 is 48 pixels in size, i.e., above the threshold of 25 pixels for "train" in the exemplary embodiment, it may be considered to be of high significance. Accordingly, based on the relative significance of the two printed defects 64, 66, the image defects are addressed differently. For example, a printed image 46 in which there are either no detected defects or in which all detected defects do not exceed the respective thresholds 62 may be considered acceptable, whereas a printed image in which at least one detected defect meets or exceeds the respective threshold 62 may be discarded. In the case of the illustrative scanned image 42, since at least one of the defects exceeds the threshold for the respective region, the corresponding printed image 46 may be discarded and reprinted, and/or other action taken to reduce the likelihood of similar defects occurring in subsequently printed images. In another embodiment, the classes may be based, at least in part, on texture.

For example, region 1 is the train and may be identified as being the subject of the photograph. In this case, if a defect, such as a white streak or white patch where toner was not applied or fused successfully to the paper exists within this region, the model would reject the print due to the defect being in a high significance region. Further, if the system is also calculating a degree of significance, e.g., based on the size of the streak, this type of defect would likely be considered a highly significant defect. In region 4, the sky may be identified as medium significance, and if defects such as mottle occur, depending on the sensitivity of the system as configured by the operator of the printer, the system may or may not reject the print based on that identification. Region 2 in this example is the gravel under the tracks. The system may identify this as being a low significance region, so even with defects occurring within this region, the printed image may be considered acceptable or marked for further review by an operator.

The model 14 may include a neural network or other suitable model which is trained to classify regions of an image. The model may identify regions as well as classify them, or a separate region identifier may be used to segment the image into regions, prior to classification. In one embodiment, the model 14 receives as input color values (e.g., RGB or CMYK color values) for all or at least a subset of the pixels of the image 20 to be classified, or of a reduced pixel size image generated from the image to be classified. The model outputs labels for regions of the image 20. The labels may be object class labels 48, significance group labels 60, or defect size thresholds 62, or other label which can be used to determine whether a defect identified in the same region of a corresponding scanned image 42 is sufficiently significant to warrant reprinting of the image and/or making modifications, e.g., printing changes (such as printer speed, dryer temperature, cleaning of inkjet nozzles), to reduce defects in subsequently printed copies of the source image.

In one embodiment, the regions identified encompass the entire image 20. In other embodiments, the model 14 only identifies significant regions and only these regions are considered for defects.

In some embodiments, the model 14 is trained on a set of images containing defects that are labeled (e.g., by humans) according to the severity of the defect. The model then leans to recognize defects in scanned images and assign them a measure of defect severity.

Neural networks useful in the model 14 are a class of algorithms based on a concept of inter-connected "neurons." In a typical neural network, input neurons contain data values, each of which affects the value of a connected neuron according to connections with pre-defined weights, and whether the sum of connections to each particular neuron meet a pre-defined threshold. By training the weights, e.g., by backpropagation, a neural network can achieve efficient recognition of objects in images. In a convolutional neural network (CNN) the neurons are grouped into a sequence of interconnected layers, with the outputs of one layer serving as the inputs for the next. The input image 20 is considered as an array of pixels for each of a set of color separations and may be input as a multidimensional matrix (e.g., a 3D or 4D tensor). For ease of identifying regions in different classes, the input image 20 may be subdivided into overlapping tiles. The output regions identified by the model may be in the form of bounding blocks (the smallest rectangle which can be fit to the region) or may be an irregular shape which more closely maps the perimeter of the object. The trained model may be validated on a portion of the training set.

Neural networks which can be used for object-based segmentation are described, for example, in U.S. Pub. Nos. 20170169315 and 20190220702, and A. Krizhevsky, et al., "ImageNet Classification with Deep Convolutional Neural Networks," NIPS, 2012, the disclosures of which are incorporated herein by reference. Commercially available, pre-trained neural networks are also available, such as the Amazon SageMaker® Object Detection algorithm. This particular algorithm detects and classifies objects in images using a single deep neural network. It is a supervised learning algorithm that takes images as input and identifies all instances of objects within the image scene. The object is categorized into one of the classes in a specified collection with a confidence score that it belongs to the class. Its location and scale in the image are indicated by a rectangular bounding box. This neural network can be trained from scratch on a large collection of images such as the ImageNet dataset, and/or may be adapted to a set of customer images.

Other object detection models can be used as the model 14. Some are based on low level features (e.g., in the form of multidimensional vectors) extracted from small patches of an image. Example features include SIFT, Fisher Kernel representations, Bag-of-Visual-Word representations, and the like. See, e.g., U.S. Pub. Nos. 20120076401, 20120045134, and Perronnin, et al., "Fisher kernels on visual vocabularies for image categorization" in CVPR (2007), Sánchez, et al., "Improving the fisher kernel for large-scale image classification," *Proc. 11th European Conference on Computer Vision* (ECCV): Part IV, pages 143-156 (2010), and Sanchez, et al., "High-dimensional signature compression for large-scale image classification," in CVPR 2011, the disclosures of which are incorporated herein by reference in their entireties.

In another embodiment, the region classification model 14 classifies regions 52, 54, 56, etc., based on saliency, e.g., assigning a high importance to regions that are predicted to have high saliency, while assigning a lower importance to regions which are relatively low in saliency. A saliency model can be trained based on attention maps for images that are based on gaze measurements—where the human eye focuses on most in the image. Models of this type are described, for example, in US Pub. Nos. 20060072847 and 20170308770, and U.S. Pat. Nos. 7,034,848 and 6,545,743, the disclosures of which are incorporated herein by reference.

In another embodiment, the region classification model 14 classifies regions 52, 54, 56, etc., based on region variability, e.g., assigning a high variability score to regions that show wide variability in color, while assigning a lower variability score to regions which are relatively monochromatic, such as sky, where defects may be more noticeable.

Figure 3:
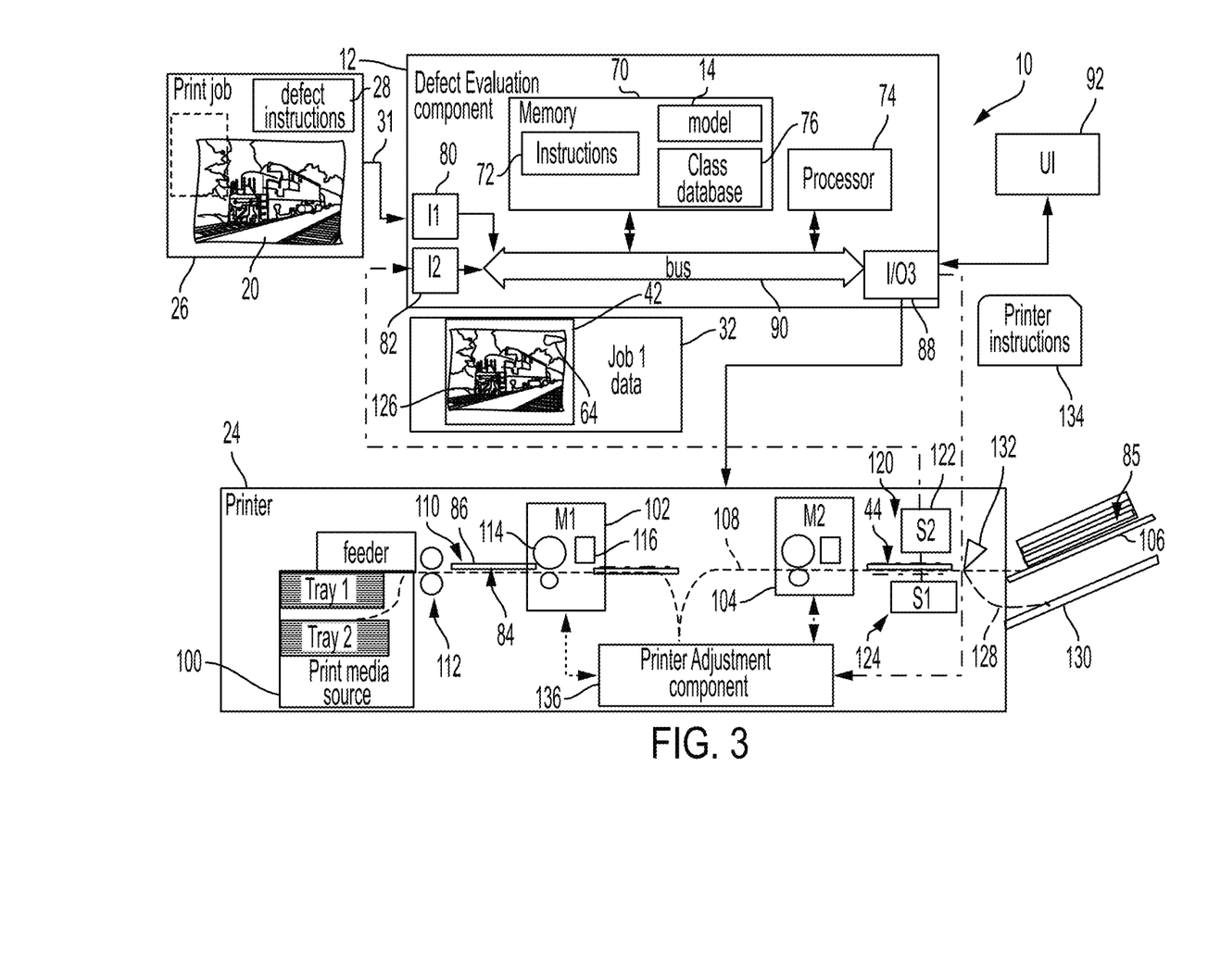
FIG. 3 is a functional block diagram illustrating one embodiment of the system of FIG. 1.

With reference now to FIG. 3, a more detailed block diagram of part of the system of FIG. 1 is shown, in accordance with one aspect of the exemplary embodiment.

The defect evaluation component 12 includes memory 70 which stores instructions 72 for performing the exemplary method and a processor 74, in communication with the memory, for executing the instructions. Memory 70 may also store an input print job 26 during processing and optionally the model 14. Scanned images 42 may also be stored in memory 70, during the exemplary method. A class database 76, which associates each of a set of defect classes 48, such as 2, 3, 10, or more classes, with respective defect significance labels 60 and/or defect thresholds 62, may also be stored in memory 70.

A first input device (I1) 80 receives the print job 26 including one or more digital page images (source images) 20, at least some of which including content to be rendered (i.e., the source image is not entirely blank). A second input device (I2) 82 (or the same input device) receives a full-width scanned image 42 which captures the printed image 44 formed on the first side 84 of each printed sheet 85 and, when duplex printing is used, receives a full-width scanned image captured of the second side 86 of each sheet. An input/output device 88 outputs the print job 26 to the selected printer 24 in a format suitable for printing. Hardware components 70, 74, 80, 82, 88 of the defect evaluation component 12 are communicatively connected by a data/control bus 90. A user interface (UI) 92, connected directly or indirectly with the evaluation component 12, e.g., via input/output device 88, allows for the user to interact with the evaluation component 12 and receive human understandable communications therefrom, e.g., in the form of text, graphics, sounds, haptic signals, combinations thereof, or the like. The user interface 92 may include a display device, such as a screen, and one or more user input devices, such as a keyboard, keypad, cursor control device, touchscreen, or combination thereof. In one embodiment, the user interface 92 may be used by a human user of the printer to associate object classes 48 with significance labels 60, each of the significance labels being associated with a respective threshold 62 on a measure of severity of defects, such as defect size (e.g., number of pixels occupied by the defect, maximum length and/or width of the defect, proportion of the image occupied by the defect). Alternatively, or additionally, the user may assign different defect size (or other measure of severity) thresholds 62 to different ones of the object classes.

Additionally, or alternatively, other defect features may be considered in determining if a defect is significant, or not. For example, the model 14, or a separate model, may be trained to assign a defect class to identified defects, e.g., selected from streak, mottle, and the like. In this embodiment, whether a defect is considered significant for a given region may depend not only on defect size but also on the class of defect.

The exemplary printer 24 includes a print media source 100, one or more marking devices 102, 104, and a printed media output device 106, which are connected by a sheet transport path 108. Sheets 110 of print media are conveyed, individually, from the print media source 100 in a downstream direction along the transport path 108 to the one or more marking devices 102, 104, and ultimately to the output device 106, by a sheet conveyor system 112, composed of transport members, such as rollers, conveyor belts, airjets, inverters, combinations thereof, or the like. As will be appreciated, the printer 24 may include additional components, such as one or more of a stacker, stapler, bookbinder, user interface, controller, and the like.

The marking device(s) 102, 104 can include any device for applying images 42 to sheets 110 of print media, using a marking material, such as inks or toners, to form at least one side of the printed sheet.

The marking devices 102, 104 may each include a marking component 114, such as a laser (xerographic) or inkjet marking component, which applies an image to the sheet using a marking material, such as inks or toner particles, and a fixing component 116, such as a dryer or a fuser, which affixes the image more permanently to the sheet, e.g., using one or more of heat, pressure or radiation, e.g., UV radiation.

In one embodiment, each marking device 102, 104 is an inkjet marking device, which applies one or more liquid inks to the sheets 110 using a set of inkjet heads. The liquid inks may be water-based inks, which are dried (fixed) to the sheet with heat by a dryer 116, downstream of the inkjet heads. Alternatively, or additionally, the inks may include a radiation curable material, which is cured (fixed) with radiation, such as UV, by a UV curing station 116, downstream of the inkjet heads.

In another embodiment, each marking device 102, 104 is an electrophotographic (laser) marking device, which applies one or more colored toners to the sheets 110 using a photoreceptor in the form of a belt or drum. The toners may be in the form of particles, which are fixed to the sheet with heat and/or pressure, e.g., by a dryer 116, downstream of the photoreceptor.

Other types of marking device, and/or a combination of types of marking device, are also contemplated.

A sensor system 120 generates the scanned images 42 and provides them to the evaluation component 12. Each (or at least some) of the printed pages 85 of a print job 26 may be automatically scanned to generate a respective scanned image 42 (or two scanned images in the case of duplex printing). The illustrated sensor system 120 includes two image capture devices, such as first and second full width array scanners 122, 124 positioned adjacent opposite sides of the transport path 108, downstream of the marking device(s), for scanning respective sides 84, 86 of the printed sheets 85. A single image capture device may be used in some embodiments. Full-width scanners are designed to capture the full width and length of the respective side of the printed sheet. The resulting scanned image 42 thus includes a target image 126, corresponding to the printed image 46, and may further include a portion of the transport member on which the printed sheet was lying when the digital image 42 was captured. The first and second scanners 122, 124 may be substantially identical and produce scanned images of the same pixel dimensions to simplify image processing.

Downstream of the sensor system 120, a discard path 128 may be provided to route printed sheets 85 that the evaluation component 12 considers unacceptable, to a discard bin 130. The sheets 85 to be discarded may be automatically routed onto the discharge path by a switch 132, which may be under the control of the evaluation component 12. Alternatively, or additionally, the evaluation component outputs printer instructions 134 for modifying one or more of the printer components with the aim of reducing the likelihood of similar defects occurring in subsequently printed sheets 85. The printer may include one or more printer adjustment components 136 for implementing the printer instructions 134.

Figure 4:
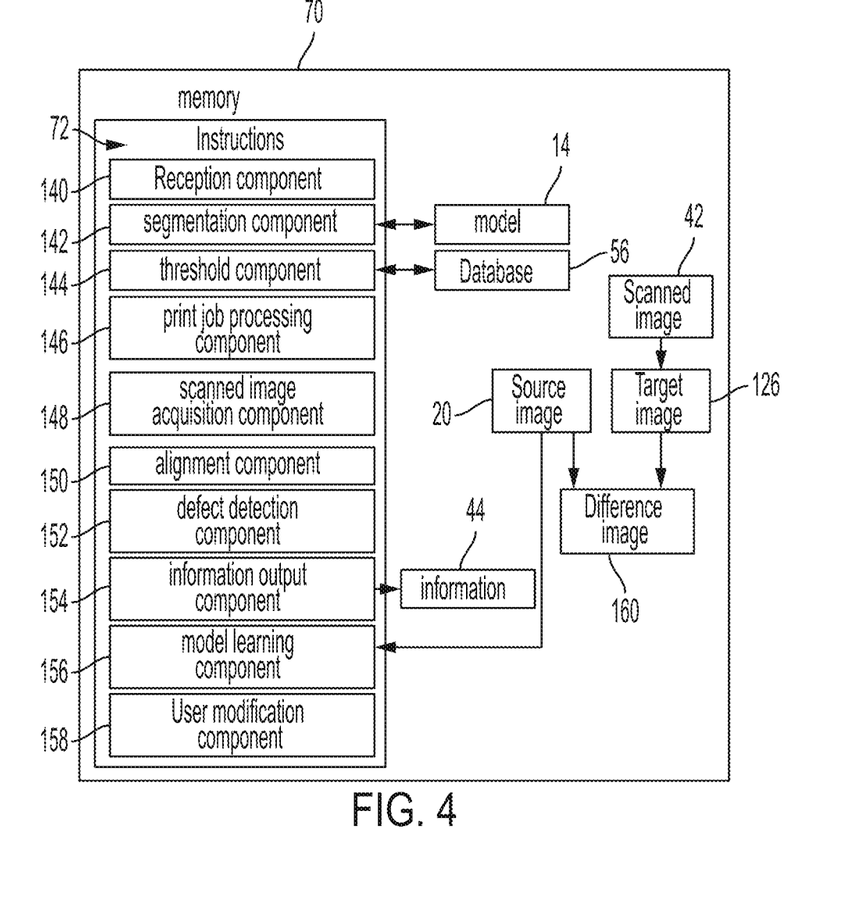
FIG. 4 illustrates exemplary components stored in memory of the system of FIG. 3.

With reference also to FIG. 3, the software instructions 72 may include at least some of: a reception component 140, a segmentation component 142, a defect threshold component 144, a print job processing component 146, a scanned image acquisition component 148, an alignment component 150, a defect detection component 152, an information output component 154, a model learning component 156, and a user modification component 158.

The reception component 140 receives incoming print jobs 26/source images 20 and scanned images 42 via inputs 80, 82 and stores them to temporary memory, e.g., in memory 70.

The segmentation component 142 uses the model 14 to segment each source image 20 into region(s), generally at least two regions 52, 54, 56 and to assign a class 48 and optionally a confidence 58 to each identified region.

The defect threshold component 144 accesses the class database 76 to identify a threshold defect size 62 for each region, based on the assigned class(es).

The print job processing component 146 processes the incoming print job 24 to place it in a suitable form for printing, which may include assigning colorant values to pixels of each page image 20. The print job processing component 146 then sends the page images to the selected printer(s) for printing, where they are printed and scanned by the sensor system 120.

The scanned image acquisition component 148 acquires the scanned images 42 from the sensor system 120 and stores them in memory 70.

The alignment component 150 aligns the scanned image 42 with the source image 20 to identify the target image 126. This may be performed according to the method described in above-mentioned U.S. application Ser. No. 16/988,183. In this method, positions of the corners of the target image 126 in the scanned image 42 are first identified. This may be performed by identifying a maximum of four edges of the target image 126 using edge detection, and defining the intersections of these edges as the corners. The length of each edge (distance between adjacent corners), or of at least two intersecting edges, can then be compared to the respective length or width of the digital image 20 from which the scanned image 42 is derived to map the target image to the source image. Alternatively, or additionally, a transform which also takes skew and/or shift into account may be computed.

The defect detection component 152 is configured for identifying, where present, one or more defects in the scanned image 42, specifically, in the target image 126 which meet or exceed the threshold size 62. Or other measure of severity, for the region 52, 54, 56 in which they are located. This may be performed by computing a difference image 160 between the source image 20 and the target image 126 at the same pixel resolution, e.g., after reducing the resolution of the two images 20, 126 so that slight mismatches of the two images are ignored. The difference image 160 may be computed by identifying pixels of the two (reduced resolution) images which differ by at least a threshold color value (e.g., an R, G, or B difference of at least 10, or at least 20 on a scale of 0-255). Alternatively, rather than reducing the resolution of images 20, 126, the average color values of groups of pixels may be compared to identify differences. The difference image 160 may thus be a map in which difference pixels (or groups of pixels) that meet or exceed the predefined color difference threshold, are identified. An area of each contiguous group of difference pixels (a defect) is then computed. For each defect in turn, the area is compared to the area threshold 62 for the class of the region in which the defect 64, 66 is located. If the defect meets or exceeds the threshold 62, the defect detection component 152 generates a decision on the acceptability of the printed image, e.g., that the printed image is acceptable or not acceptable (or does or does not warrant a further review by a user). If the printed image is determined to be not acceptable, the corresponding printed page 85 may be flagged to be discarded. Otherwise, the method proceeds to a next defect. Once one defect that meets or exceeds the threshold size or other measure of severity is identified, there is no need to consider other identified defects in the difference image. To speed up processing, defects in a regions or regions 52, 54, 56 of the difference image 160 with the lowest threshold 62 may be evaluated first. Additionally, in the case of duplex printing, there is no need to evaluate a captured image of the second side of the printed sheet if a defect meeting the size threshold is identified in the first side.

The information output component 154 outputs information 44, based on the defect(s) identified by the defect detection component 152. In the case where no defects meeting the thresholds 62 are identified, the information may include a determination that the printed page 85 is acceptable. Alternatively, no output information may be generated in this case. In the case where one or more defects meeting the thresholds 62 is/are identified, the information 44 may include a determination that the printed page is not acceptable and/or other information based thereon, such as instructions to the printer (or a user, via the user interface 92), that the printed page should be discarded. Alternatively, or additionally, the information 44 includes printer instructions 134 for modifying the printer to reduce the likelihood of future defects.

The model learning component 156 generates the model 14, using labeled training data 16. As will be appreciated, this may be performed offline by a separate computing device. The model may be updated by model learning component 156 periodically, e.g., using source images 20 as training data. The source images used as training data may include those for which the regions 52, 54, 56 and classes 48 identified by the model 14 have been validated by a user, e.g., via the user interface 92.

The user modification component 156 receives and acts on inputs from a human user, e.g., input via the user interface 92. For example, when the user assigns a significance 60 or threshold 62 to a particular class 48, the class database 76 may be updated (or temporarily overridden). The user may have a customer more interested in wildlife than people, and input a request for the significance of the group "wildlife" to be set to maximum for that customer's print jobs. The user modification component 156 then adjusts (in this case lowers) the threshold 62. The user may also decide to temporarily override the evaluation component 12, in which case the user modification component 156 temporarily suspends its operation. Or, the user may request, via the user interface 92, that the model 14 be retrained, e.g., using customer images 20, in which case, the user modification component 156 initiates retraining of the model 14.

The defect evaluation component 12 may include one or more computing devices, such as a PC, such as a desktop, a laptop, palmtop computer, portable digital assistant (PDA), server computer, cellular telephone, tablet computer, pager, combination thereof, dedicating computing device, such as the digital front end of the printer, or other computing device capable of executing instructions for performing the exemplary method.

The memory 70 may represent any type of non-transitory computer readable medium such as random access memory (RAM), read only memory (ROM), magnetic disk or tape, optical disk, flash memory, or holographic memory. In one embodiment, the memory 70 comprises a combination of random access memory and read only memory. In some embodiments, the processor 74 and memory 70 may be combined in a single chip. Memory 70 stores instructions for performing the exemplary method as well as the processed data and may also store instructions for operating the printer 24.

The interfaces 80, 82, 88 allow the computer to communicate with other devices via a computer network, such as a local area network (LAN) or wide area network (WAN), or the internet, and may comprise a modulator/demodulator (MODEM) a router, a cable, and/or Ethernet port.

The digital processor device 74 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 5:
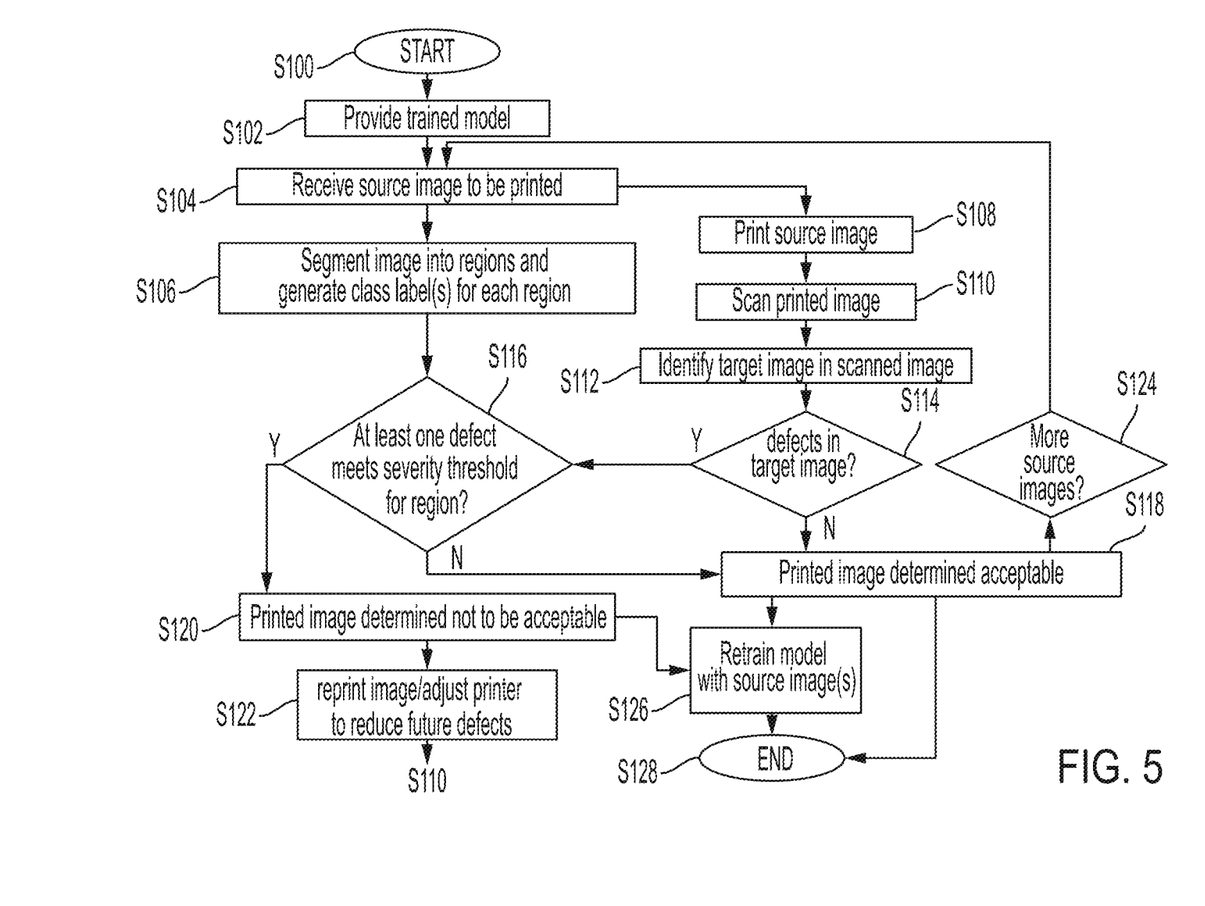
FIG. 5 is a flow chart illustrating a method for evaluating impacts of printed image defects.

With reference to FIG. 5 a method for addressing defects is illustrated. The method may be performed with the system of FIGS. 1-4. The method begins at S100.

At S102, a trained model 14 is provided. This may include training a model using training data 16, or providing a pretrained model.

At S104, a source image 20 to be printed is received, by the reception component 140, and stored in memory 70.

At S106, the source image 20 is input to the model 14, which segments the image into regions and outputs a class label for one or more identified regions of the image. While the exemplary method uses the source image 20 for identifying regions, in another embodiment, this step may be performed on the scanned image 42 or target image 64.

At S108, the image 20 is sent to the printer for printing as a printed image 46.

At S110, a scanned image 42, captured of the printed image 46, is received, by the reception component 140, and may be stored in memory 70.

At S112, the scanned image 42 is aligned with the source image 20 to identify a target image 126 of the same dimensions as the source image, by the alignment component 150.

At S114, the target image 126 is compared to the source image to identify defects. Defects of less than a minimum size may be ignored. If at least one defect is identified, the method proceeds to S116, otherwise to S118.

At S116, each defect is examined, e.g., in turn, to determine whether its size meets the threshold for the region in which it is located (and/or if the defect is of a defect type which is not accepted in that region). If a defect is identified which meets the threshold, the method proceeds to S120.

At S118, the printed image 46 is determined to be acceptable, with respect to defects. Information 44 confirming the acceptability may be output.

At S120, the printed image 46 is determined not to be acceptable, and may be automatically discarded or flagged as not acceptable (or in need of manual review).

At S122, the unacceptable image may be reprinted, optionally after making adjustments to the printer to reduce the likelihood of further defects, such as purging inkjet nozzles, changing the print speed, adjusting the dryer temperature, or the like. The method may return to S110 for the reprinted image.

At S124, the method may return to S104 for the next source image 20.

In some embodiments, at S126, one or more processed source images may be used, by the model learning component 156, to retrain the model 14. In one embodiment, data from all customer jobs is fed to a database to continually train the neural network 14 to be redeployed. In other embodiments, only data from some jobs is fed back, based on it meeting a predetermined criteria, such as difficulty interpreting the image or human intervention being required. In one embodiment, the retraining of the model is specific to a printer, customer site, or the like.

The method ends at S128.

The method illustrated in FIG. 5 may be implemented, at least in part, in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 30 (for example, an internal hard drive of RAM), or may be separate (for example, an external hard drive operatively connected with the computer 30), or may be separate and accessed via a digital data network such as a local area network (LAN) or the Internet (for example, as a redundant array of inexpensive or independent disks (RAID) or other network server storage that is indirectly accessed by the computer-implemented evaluation component 12, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphics card CPU (GPU), application-specific integrated circuit (ASIC), or PAL, or the like. In general, any device, capable of implementing a finite state machine that is in turn capable of implementing the flowchart shown in FIG. 5, can be used to implement the method for evaluating defects. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Benefits of the exemplary system and method system include being able to reduce cost per print. For example, if defects are outside of significant regions, the system may not need components maintained or purging printheads to be performed. This may also reduce the reject rate of prints that may meet customer expectations due to defects occurring in less significant areas of the printed images.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for evaluating defects in printed images, comprising:
   receiving a target image, captured of a printed image;
   identifying one or more defects in the target image, where present, which do not occur in a source image from which the printed image was generated;
   with a trained classification model, segmenting the source image into regions and predicting a defect class for each of the regions of the source image and respective regions of the target image, each of the defect classes being drawn from a predefined set of at least three defect classes, each of the defect classes being associated with a threshold measure of severity;
   for at least one of the identified defects, determining a measure of severity of the defect;
   making a decision on an acceptability of the printed image, based on the measure of severity of the at least one defect and the threshold measure of severity associated with the predicted defect class of a respective one of the regions of the target image in which the defect occurs.

2. The method of claim 1, wherein the receiving of the target image comprises receiving a scanned image of the printed image and aligning the scanned image with the source image to identify the target image.

3. The method of claim 1, wherein the identifying defects in the target image comprises identifying differences between the target image and the source image.

4. The method of claim 1, wherein the trained model has been trained on labeled images, labels of the training images each identifying at least a first region of a respective training image and a respective defect class.

5. The method of claim 1, wherein the defect classes in the set of defect classes are each associated with a defect significance, at least one of the classes having a higher defect significance than a second of the defect classes.

6. The method of claim 1, wherein there are at least ten defect classes.

7. The method of claim 1, further comprising associating a measure of confidence with the predicted defect class.

8. The method of claim 1, wherein the defect classes comprise visual object classes.

9. The method of claim 1, wherein the trained model comprises a neural network.

10. The method of claim 1, wherein the determining of the measure of severity of the defect comprises comparing a size of the defect to a threshold size, the threshold size being based on the defect class for the region in which the defect is located.

11. The method of claim 1, wherein the determining of the measure of severity of the defect comprises identifying a type of the defect, selected from a set of defect types.

12. The method of claim 1, wherein the making of the decision on the acceptability of the printed image comprises determining whether or not the printed image should be discarded.

13. The method of claim 12, wherein when the decision is to discard the printed image, performing at least one of:
   causing the printed image to be directed to a discharge path of a printer which printed the printed image;
   alerting a user that the printed image should be discarded; and
   modifying the printer to reduce a probability that a subsequent printed image will include defects.

14. The method of claim 1, further comprising:
   sending the source image to a printer for printing the printed image on print media with a marking material; and
   scanning the printed image with a scanner to generate a scanned image comprising the target image.

15. The method of claim 1, further comprising updating the classification model based on the source image.

16. A system for evaluating defects in printed images, comprising memory which stores instructions for performing the method of claim 1 and a processor in communication with the memory which executes the instructions.

17. A system for evaluating defects in printed images, comprising:
   a printer which renders a source image on print media to generate a printed image;
   an image capture device which captures a target image of the printed image;
   a classification model trained to segment the source image into regions and predict defect classes for the regions of the source image and corresponding regions of the target image from a set of predefined defect classes, each of the defect classes being associated with a threshold defect size; and
   a defect evaluation component which is configured for:
      identifying defects in regions of the target image which each exceed the threshold size for the predicted class output by the model for a respective one of the regions in which the defect is located; and
      making a determination on an acceptability of the printed image based on at least one of the identified defects.

18. The system of claim 17, wherein the classification model comprises a neural network.

19. The system of claim 17, wherein the defect evaluation component includes a model learning component which updates the classification model using the source image.

20. A method for evaluating defects in printed images, comprising:
   printing a digital source image on a sheet of print media using marking materials to generate a printed image;
   capturing a digital target image of the printed image;
   with a trained classification model, predicting a respective class for each of at least one region of the source image, each of the classes being drawn from a set of classes, each of the classes in the set being associated with a respective threshold measure of severity;
   identifying at least one defect in the target image, where present, which does not occur in the source image and which meets the threshold measure of severity for a respective region in which the defect is located; and
   determining an acceptability of the printed image, based on the identified at least one defect, where present.

* * * * *